June 4, 1968  ICHIRO TSUNODA  3,386,406
CONTROL APPARATUS OF AN ELECTRICALLY DRIVEN TOY
Filed Dec. 12, 1966  4 Sheets-Sheet 1

INVENTOR.
ICHIRO TSUNODA
BY
Kurt Kelman
AGENT

June 4, 1968 ICHIRO TSUNODA 3,386,406
CONTROL APPARATUS OF AN ELECTRICALLY DRIVEN TOY
Filed Dec. 12, 1966 4 Sheets-Sheet 4
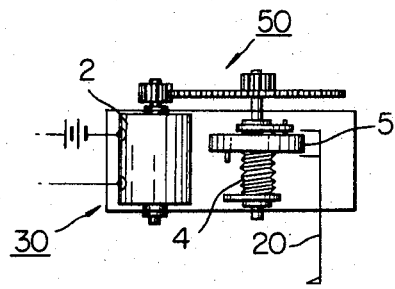
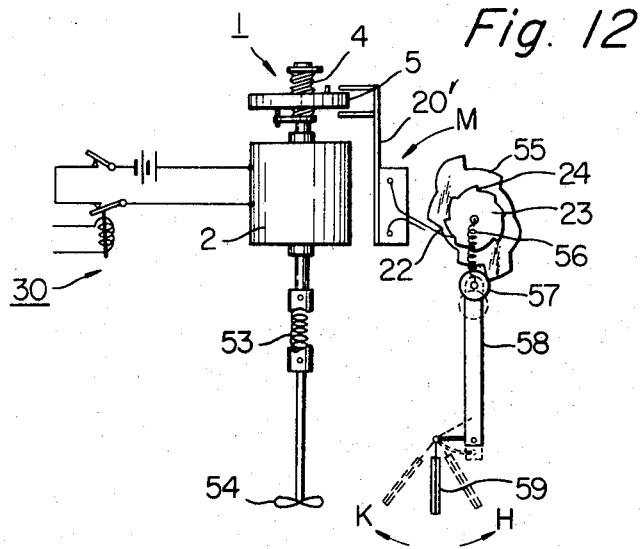
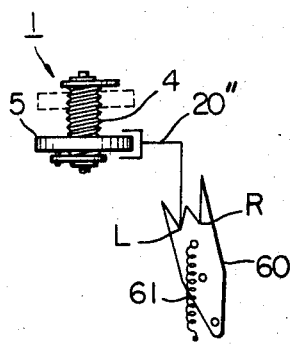
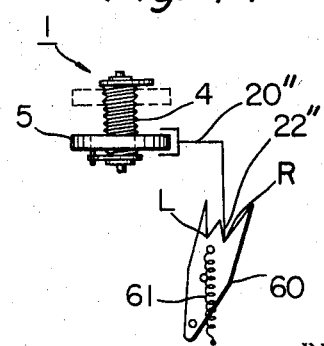
INVENTOR.
ICHIRO TSUNODA
BY
Kurt Kelman
AGENT

United States Patent Office 3,386,406
Patented June 4, 1968

3,386,406
CONTROL APPARATUS OF AN ELECTRICALLY DRIVEN TOY
Ichiro Tsunoda, 1397 Maenuma, Iyo-cho, Adachi-ku, Tokyo, Japan
Filed Dec. 12, 1966, Ser. No. 601,066
Claims priority, application Japan, Dec. 14, 1965, 40/76,447
8 Claims. (Cl. 114—144)

ABSTRACT OF THE DISCLOSURE

An electrically operated toy vehicle which is steered by an inertia operated mechanism including a threaded spindle driven by an electric motor, a flywheel threadedly movable on the spindle, and a linkage arrangement transmitting the axial movement of the flywheel on the spindle during acceleration or deceleration of the motor to the steering mechanism which may consist of a clutch connecting the motor to one of two drive wheels if the vehicle is a car, or of a rudder when the vehicle is a boat.

Background of the invention

This invention relates to electrically operated vehicles, and particularly to an improvement in the steering mechanism for such a vehicle.

It is known to equip two drive wheels of a toy car with individual motors and to operate the motors individually or jointly for moving the car forward or backward in a straight or curved path. Such toy cars can be manufactured only at relatively high cost and the operation of their control apparatus, requires relatively high skill.

Among the objects of this invention is the provision of a toy vehicle which can be produced at little expense and which can readily be adapted to remote control.

Summary of the invention

In one of its aspects, the invention provides an electrically operated toy vehicle, whose motor may be accelerated and decelerated by means of a switch, with improved actuating means for the steering mechanism which include an inert mass movable relative to the motor, motion transmitting means which connect the mass to the motor for common movement during normal motor operation, and which respond to a change in motor speed for moving the mass between the afore-mentioned positions thereof. The inert mass is linked to the steering mechanism for operating the same in response to movement of the mass between its two positions.

The exact nature of this invention as well as other objects and advantages thereof will become readily apparent from the following detailed description of preferred embodiments when considered in connection with the attached drawing.

Brief description of the drawing

In the drawing:

FIGS. 7 to 11 illustrate modified details for the apparatus of FIG. 2 in corresponding views;

FIG. 12 shows the drive and steering mechanism of a toy boat in a view corresponding to FIG. 2; and FIGS. 13 and 14 show a modified detail for the boat of FIG. 12 in two operating positions.

Referring now to the drawing in detail, FIG. 1 shows a remotely controlled toy car of the prior art in which two driving wheels 101, 101a are coupled to individual motors 102, 102a. A control mechanism 103 remotely controls the direction and speed of each motor so that the car may be moved forwardly and backwardly, to the right and to the left.

Figure 1:
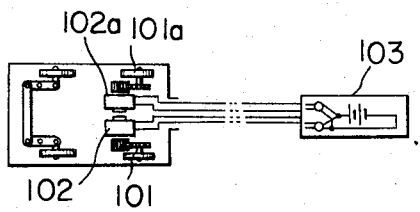
FIG. 1 shows a known toy car in partly diagrammatic bottom view.
Figure 2:
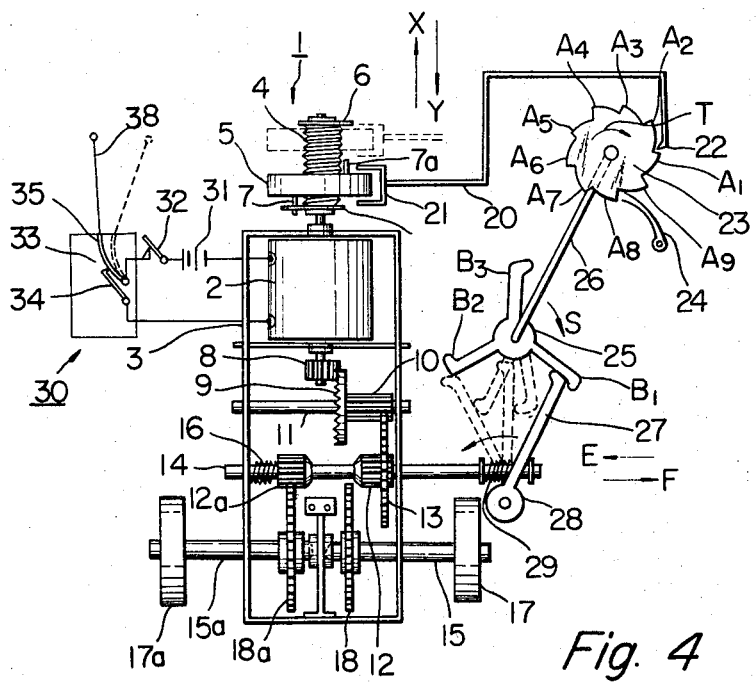
FIG. 2 shows a toy car of the invention in a fragmentary plan view, portions of the structure being distorted for the sake of clarity, and others being shown conventionally.

In the toy car of the invention partly shown in FIG. 2, an inertia responsive mechanism 1 is mounted on one end of the drive shaft of an electric motor 2 fixedly mounted on the vehicle frame 3.

Figure 3:
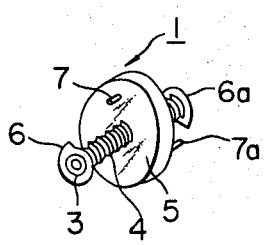
FIG. 3 shows an element of the device of FIG. 2 in a perspective view.

The mechanism, as is also seen in FIG. 3, includes a threaded carrier spindle 4 coaxially attached to the motor shaft and an internally threaded flywheel 5 movably engaged by the spindle 4. Abutments 6, 6a are provided on the ends of the spindle to engage eccentric axial pins 7, 7a respectively on the flywheel 5 for limiting the threaded movement of the latter.

A pinion 8 is fastened to the other end of the motor shaft in meshing engagement with a crown wheel 9 on a shaft 11 which is journaled in the frame 3. A pinion 10 on the shaft 11 meshes with a gear 13 on an axially movable clutch shaft 14 in all axial positions of the last-mentioned shaft. Pinions 12, 12a on the clutch shaft 14 engage drive gears 18, 18a on the axles 15, 15a of drive wheels 17, 17a respectively in the two axially terminal positions of the shaft 14. The shaft is biased toward the position illustrated in FIG. 2 by a compression spring 16 so that the motor 2 drives the wheel 17a.

The forked end 21 of a control arm 20 engages the flywheel 5 without interferring with the rotation of the wheel. The other end 22 of the arm 20 forms a pawl which cooperates with the teeth $A_1$ to $A_9$ of a ratchet 23. A dog 24 prevents counterclockwise rotation of the ratchet 23, as viewed in FIG. 2.

A toothed cam 25 having three equiangularly spaced, hook-shaped teeth $B_1$–$B_3$ is coupled to the ratchet 23 by a shaft 26. In the position of the cam 25 shown in FIG. 2, the arm $B_1$ abuts against the free end of a clutch operating lever 27 whose other end 28 is pivotally mounted on the frame 3. A spring 29 on the shaft 14 urges the lever 27 against the arm $B_1$.

The power supply circuit 30 of the motor 2 consists of a battery 31, a main switch 32, and an operating switch 33 arranged in series. The operating switch 33, as better seen in part in FIG. 4, has a fixed contact 34 and a movable contact 35 provided with an antenna-shaped arm 38 which extends outwardly of the body of the toy car only partly shown in FIG. 2.

Figure 4:
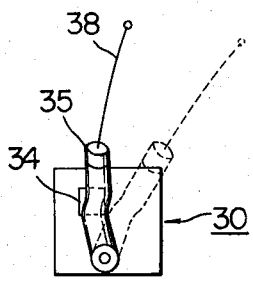
FIG. 4 shows another element in a similar view.

The afore-described apparatus is operated as follows:

When the arm 38 is moved from the position shown in broken lines in FIGS. 2 and 4 into the fully drawn position, the motor 2 is energized, and the flywheel 5 is held in the position shown in FIG. 2 by inertia and by the rotation of the spindle 4. Power is transmitted from the motor 2 to the wheel 17a.

When the switch 33 is opened by moving the arm 38 to the position shown in broken lines, the speed of the motor 2 is abruptly reduced, and the flywheel 5 moves threadedly on the spindle 4 in the direction of the arrow X to the position indicated in FIG. 2 in broken lines, in which it is stopped by engagement of the pin 7a with the abutment 6a.

When the switch 33 is closed again, the spindle 4 turns in the flywheel 5 until the latter is returned to the fully drawn position in the direction of the arrow Y. The arm 20 moves back and forth in the direction of the arrows X, Y with the flywheel 5.

The pawl 22 advances the ratchet 23 by one tooth in the direction of the arrow T during each reciprocating movement of the arm 20, whereby the cam 25 is rotated in the direction of the arrow S.

Figure 5:
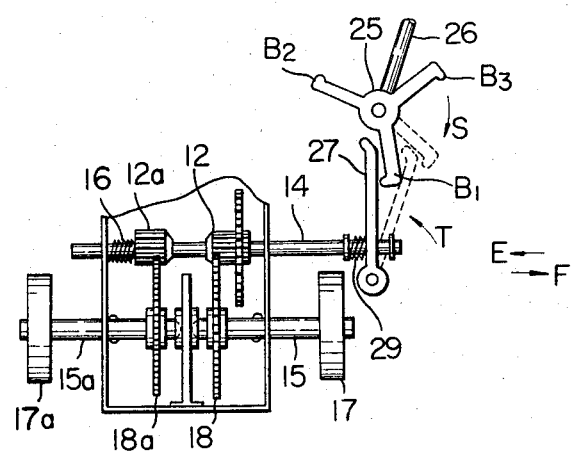
FIGS. 5 and 6 show a portion of the apparatus of FIG. 2 in different operating positions.

When the arm $B_1$ is moved from the position shown in full lines in FIG. 2 to the position illustrated in FIG. 5, the lever 27 shifts the shaft 14 in the direction of the arrow E in FIG. 5 to engage the pinion 12 with the drive gear 18, while engagement between the pinion 12a and the gear 18a is maintained. The spring 29 permits movement of the lever 27 even if the pinion 12 is not immediately positioned to mesh with the drive gear 18.

Figure 6:
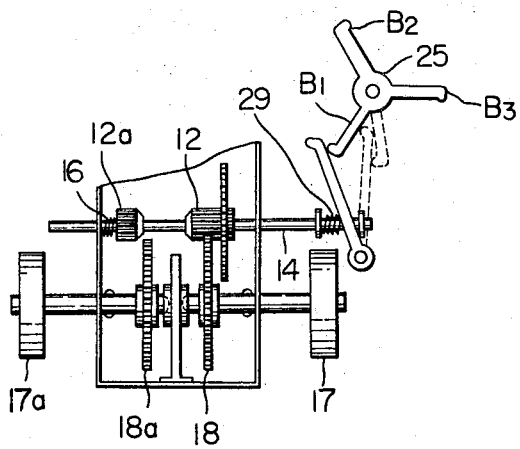

When the switch 33 is again opened and closed, as described above, by means of the arm 38, the cam 25 moves to the position shown in fully drawn lines in FIG. 6, whereby the arm $B_1$ and the lever 27 cause the clutch shaft 14 to be moved far enough in the direction of the arrow E to disengage the pinion 12a from the drive gear 18a while the pinion 12 and the gear 18 remain in engagement.

During the next angular movement of the ratchet 23, the arm $B_1$ is disengaged from the lever 27, and the latter returns to its initial position in abutting engagement with the arm $B_3$, as shown in FIG. 6 in broken lines.

If the toy car partly illustrated in FIG. 2 turns to the right when the wheel 17a is driven, as shown in FIG. 2, it is made to run straight when the clutch shaft 14 assumes the position shown in FIG. 5 after one opening and one closing of the switch 33. It turns left after another sequence of switch operations (FIG. 6), and reverts to the original condition after the third sequence.

Figure 7:
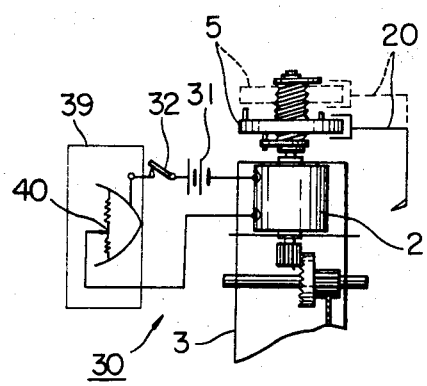
Figure 8:
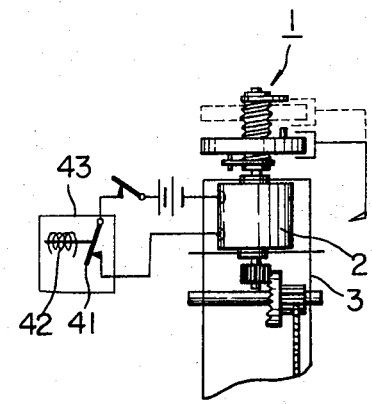
Figure 9:
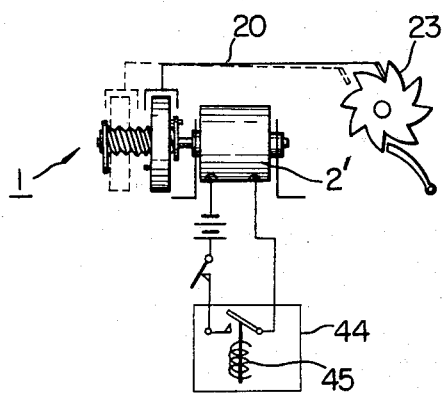

The switch 33 may be replaced by a remotely operated switch, as illustrated in FIGS. 7 and 8. FIG. 7 shows the motor 2, battery 31, and main switch 32 arranged in a series circuit with a receiver 39 for sound waves which has a contact 40 arranged to vibrate in response to the sound of a whistle or the like so that the resistance of the power supply circuit is increased.

As long as the whistle is blown, the rotary speed of the motor 2 is sharply lowered, and full speed is resumed when the whistle sound stops. The alternating acceleration and deceleration of the motor 2 cause the flywheel 5 to move axially back and forth on the spindle 4, and the mode of operation of the toy car is changed, as described above.

In the toy car partly shown in FIG. 8, a relay 42 opens and closes contacts 41 in an operating switch 43. The relay 42 may be operated remotely in response to sound, to electromagnetic signals, or to light in a manner known in itself to produce the effects described above.

The motor which operates the inertia responsive mechanism of the invention need not necessarily be the drive motor of the toy car but may be an auxiliary motor 2' which may be controlled by an operating switch 44 operated by a relay 45.

Figure 10:
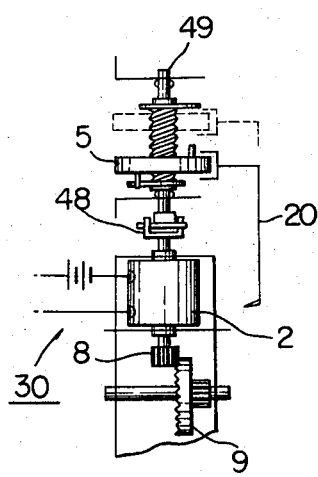

The spindle 4 need not be directly attached to the shaft of a motor but may be connected to the motor by a claw coupling 48, as shown in FIG. 10, or by a gear transmission 50, as is shown in FIG. 11.

The control mechanism described above may readily be applied to other toy vehicles to control different operations. FIG. 12 shows the drive mechanism and steering gear of a toy boat according to the invention.

A propeller 54 is connected to the output shaft of the motor 2 by a spring coupling 53. A control arm 20' similar to the afore-described arm 20 advances a ratchet 23 in the direction of an arrow M when the motor 2 is energized and deenergized by a power supply circuit 30. A cam disc 55 attached to the ratchet cooperates with a cam follower roller 57 at one end of a connecting rod 58 attached to the supporting shaft of the ratchet 23 by a spring 56. The other end of the rod 58 is hinged to the tiller of a rudder 59.

When the motor 2 is stopped and started, the rudder 59 is swung back and forth, as indicated by arrows K, H between positions in which it causes the boat to move straight ahead, the right, or to the left.

The ratchet described above may be replaced by a rocker 60, as shown in FIGS. 13 and 14. The end of one arm of the rocker has a forked notch which has a W-shaped cam face. The flywheel 5 shifts a control arm 20'' in response to acceleration and deceleration of a motor, not itself shown in FIGS. 13 and 14. The free end 22' of the arm 20'' constitutes a cam follower held in contact with the cam face of the rocker 60 by a helical tension spring 61 arranged to pivot the rocker 60 away in either direction from a position of alignment between the central lobe of the cam face between the forks R and L of the notch and the cam follower 22'.

As shown in FIG. 13, the inertia operated mechanism 1 is in the position assumed when the associated motor is energized, and the cam follower 22' engages the fork L. When the motor is decelerated, and the flywheel 5 moves to the position shown in broken lines, the cam follower 22' is withdrawn from the fork L, permitting the rocker 60 to be moved counterclockwise until the cam follower 22' strikes the longer wall of the fork R. When the motor thereafter is accelerated, and the flywheel returns to the fully drawn position, camming engagement of the follower 22 with the wall of the fork R causes the rocker to be tilted into the position shown in FIG. 14. It returns to the position shown in FIG. 13 during the next sequence of motor deceleration and acceleration.

An eyelet on the arm of the rocker 60 remote from the forked notch R, L may be connected with a steering mechanism in a manner obvious from FIG. 12.

What is claimed is:

1. In a toy vehicle having an electric motor, a power supply circuit connected to said motor and including switch means for accelerating and decelerating said motor, steering means for changing the direction of movement of said vehicle, and actuating means for operating the steering means, the improvement in the actuating means comprising:
   (a) an inert mass movable relative to said motor between two positions;
   (b) motion transmitting means connecting said mass to said motor for movement therewith during operation of the motor, and responsive to a change in the speed of said motor for moving said mass between said positions thereof; and
   (c) linking means connecting said mass to said steering means for operating the same in response to movement of said mass between said positions.

2. In a vehicle as set forth in claim 1, said motion transmitting means including a carrier member having an axis and being threaded about said axis, said motor being drivingly connected to said carrier member for rotating the same about said axis, said inert mass engaging said carrier member for threaded movement on the carrier member.

3. In a vehicle as set forth in claim 2, means for propelling said vehicle, and a drive train connecting said motor to said propelling means.

4. In a vehicle as set forth in claim 3, said propelling means including two drive shafts, said drive train including clutch means for alternatively connecting said shafts to said motor, and said steering means including clutch operating means connected by said linking means to said mass for operating said clutch means in response to said movement of said mass.

5. In a vehicle as set forth in claim 4, said linking means including an angularly movable ratchet, a pawl member engaging said ratchet, means connecting said pawl member to said inert mass for movement therewith in such a manner that said pawl member angularly moves the ratchet when said inert mass moves between said positions, and connecting means operatively interposed between said clutch operating means and said ratchet for operating said clutch means in response to said angular movement.

6. In a vehicle as set forth in claim 5, said clutch operating means including a lever member and yieldably resilient means biasing said lever member toward a position in which the clutch means connects one of said shafts to said motor, said connecting means including a toothed cam connected to said ratchet for joint angular movement, the teeth of said cam being engageable with said lever member for moving the same away from said position thereof against the restraint of said resilient means during said movement of the cam.

7. In a vehicle as set forth in claim 3, said propelling means including a propeller, said drive train including coupling means connecting said propeller to said motor, and said steering means including a rudder.

8. In a vehicle as set forth in claim 2, means for propelling said vehicle, another electric motor, and a drive train connecting said other motor to said propelling means.

References Cited

UNITED STATES PATENTS 2,742,735    4/1956    Sommerhoff ____ 114—144 XR

ANDREW H. FARRELL, *Primary Examiner.*